United States Patent [19]

Matsui

[11] 4,225,269
[45] Sep. 30, 1980

[54] FUNNEL-SHAPED STRUCTURAL BLOCK AND ASSEMBLIES OF SUCH BLOCKS FOR SHORE PROTECTION

[76] Inventor: Atsushi Matsui, 12, Baban-Cho, Shizuoka-Shi, Shizuoka-Ken, Japan

[21] Appl. No.: 10,157

[22] Filed: Feb. 7, 1979

[30] Foreign Application Priority Data

Feb. 15, 1978 [JP] Japan .................................. 53-16148
May 30, 1978 [JP] Japan .................................. 53-64708

[51] Int. Cl.² .................. E02B 3/06; E02D 5/10; E02D 5/48
[52] U.S. Cl. .................. 405/33; 46/23; 52/608; 405/231; D25/80; D25/93; D25/95
[58] Field of Search .................. 405/29–35, 405/15, 25, 253, 231; 52/608; 46/23, 24, 25; D25/80, 93, 95, 90, 97, 94

[56] References Cited

U.S. PATENT DOCUMENTS

| 1,960,888 | 5/1934 | Atwell | 405/253 |
| 3,091,087 | 5/1963 | Danel | 405/29 |
| 3,636,713 | 1/1972 | O'Neill | 405/29 |
| 3,670,449 | 6/1972 | Lemkin et al. | 46/23 |
| 3,676,976 | 7/1972 | McAllister | 52/2 |
| 4,083,190 | 4/1978 | Pey | 52/608 |

*Primary Examiner*—Roy D. Frazier
*Assistant Examiner*—Alexander Grosz
*Attorney, Agent, or Firm*—Haseltine, Lake & Waters

[57] ABSTRACT

For use as a structural unit in a variety of coastal and other civil engineering works, a formed block or pile of concrete or other material is provided which comprises a conical body and a cylindrical leg extending coaxially from the vertex of the body. Offshore breakwaters can be built by laying a multiplicity of such funnel-shaped blocks into one or, usually, two or more superposed horizontal layers, with each block having its leg oriented downwardly. At least the lowermost layer of blocks are buried directly into the seabed, and the upper layer or layers of blocks are installed with or without use of a support structure serving to prop up each block.

13 Claims, 8 Drawing Figures

FUNNEL-SHAPED STRUCTURAL BLOCK AND ASSEMBLIES OF SUCH BLOCKS FOR SHORE PROTECTION

BACKGROUND OF THE INVENTION

1. Field of the Invention

This invention pertains to formed blocks or piles of concrete or other material for use as structural units in the construction of a variety of shore-protective works, among other applications. This invention is further directed to offshore breakwaters and like structures that are built by laying a multiplicity of such blocks into one or more layers and which function to control the processes of erosion and accretion, thereby contributing to coastal protection.

2. Description of the Prior Art

Coastal engineers have expended much effort for the development of measures truly effective to prevent the wave-induced erosion of beaches and shorelines. Yet various existing types of breakwaters, for example, seem to have some weakness or other. I myself have recently witnessed a sand-cored, concrete breakwater which had collapsed overnight as a result of action by tidal waves. This accident was obviously due to the undermining of the rigid and impervious breakwater by the tidal waves, resulting in the outflow of the core sand and in the consequent breakdown of the concrete top and side slopes.

Also responsible for the collapse of the breakwater in question was the great vertical load that had been exerted on the seabed by the breakwater itself. Since the breakwater had its understructure buried relatively deep into the seabed, it has presumably blocked the flow of underground water under its own weight. The tidal waves, however, forced the underground water to flow and thus caused the outflow of the core sand.

The tetrapod, a cast concrete form with four symmetrically spaced legs, represents another example of prior art pertinent to my invention. Although tetrapods can dissipate and damp wave action, they do, however, have certain disadvantages, one of these being their vulnerability to fracture. As an additional disadvantage, any aggregate of tetrapods imposes a considerable vertical load upon its foundation, possibly causing the same to sink.

SUMMARY OF THE INVENTION

It is an object of this invention to provide a formed block or pile of concrete, plastics or other material having novel and improved configuration well calculated for use as a structural unit in a wide variety of coastal and other civil engineering works.

Another object of this invention is to provide a formed structural block or pile, as aforesaid, equipped with means for facilitating its embedment in sand or other comparatively loose foundation material, particularly in the construction of offshore breakwaters and like shore-protective structures.

A further object of this invention is to provide offshore breakwaters and like structures, as for preventing shore erosion or building beaches, that are readily and economically constructed by such structural blocks or piles and which will perform their intended functions to the full over an extended period of time under rigorous conditions of use.

In brief, this invention can be summarized as a funnel-shaped structural block or pile comprising a substantially conical body and a leg extending coaxially from the vertex of the conical body. Preferably, the conical surface of the body is formed at an angle of about 45 degrees with respect to the axis of the block. The entire funnel-shaped block may either be a concrete casting or a plastic molding, with or without built-in reinforcing bars or the like.

When the funnel-shaped structural block is buried in a desired foundation material, with its leg oriented downwardly, most of the load exerted by its weight on the material becomes evenly distributed in the directions normal to its conical surface. The leg of the block serves to concentrate its total weight and acts as a vertical guide in burying the block. Moreover, after the block is buried to a desired depth, the leg performs the additional function of holding the block in vertical disposition in spite of possible eccentric loads to be exerted thereon. Thus, the combined effect of the inverted-conical shape of the body of the block and the leg imparts great stability to the block and therefore to the entire assembled structure.

Another notable property of the funnel-shaped structural block is its excellent wave damping ability. Thus, according to another aspect of this invention, a multiplicity of such elementary blocks are assembled into one or, preferably, two or more superposed layers to provide a shore-protective structure. All the blocks have their legs directed downwardly. The shore-protective structure finds particular utility as an offshore breakwater intended primarily to prevent shore erosion or, as a more positive function, to widen the beach area. By virtue of the above explained properties of its constituent funnel-shaped blocks, the offshore breakwater successfully overcomes the noted drawbacks of the prior art.

The above and other objects, features and advantages of this invention and the manner of attaining them will become more readily apparent, and the invention itself will best be understood, from the following description of preferred embodiments taken in connection with the accompanying drawings.

DESCRIPTION OF THE PREFERRED EMBODIMENTS

Figure 1:
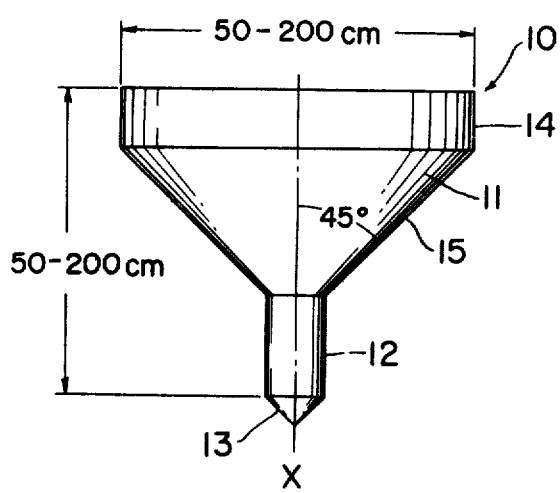
FIG. 1 is a side elevational view of a preferred form of the funnel-shaped structural block in accordance with this invention.
Figure 2:
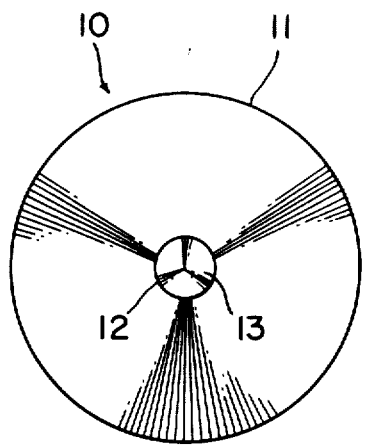
FIG. 2 is a bottom plan view of the block of FIG. 1.

FIGS. 1 and 2 illustrate the funnel-shaped structural block or pile according to this invention, which is generally designated 10. The block 10 comprises a body 11 substantially in the shape of a right circular cone, and a leg 12 of cylindrical shape extending coaxially from the vertex of the conical body and terminating in a tapered or conical tip 13. The base end of the conical body 11 is formed into a cylindrical portion 14. The complete block 10 can be fabricated from any suitable material such as concrete or plastics.

Preferably, as indicated in FIG. 1, the elements of the conical surface 15 of the block body 11 are at an angle of approximately 45 degrees with respect to the centerline axis X of the block 10. For most practical purposes the block 10 may have a body diameter of 50 to 200 centimeters (cm) and a total height (excluding the tapered tip 13) of 50 to 200 cm.

Figure 3:
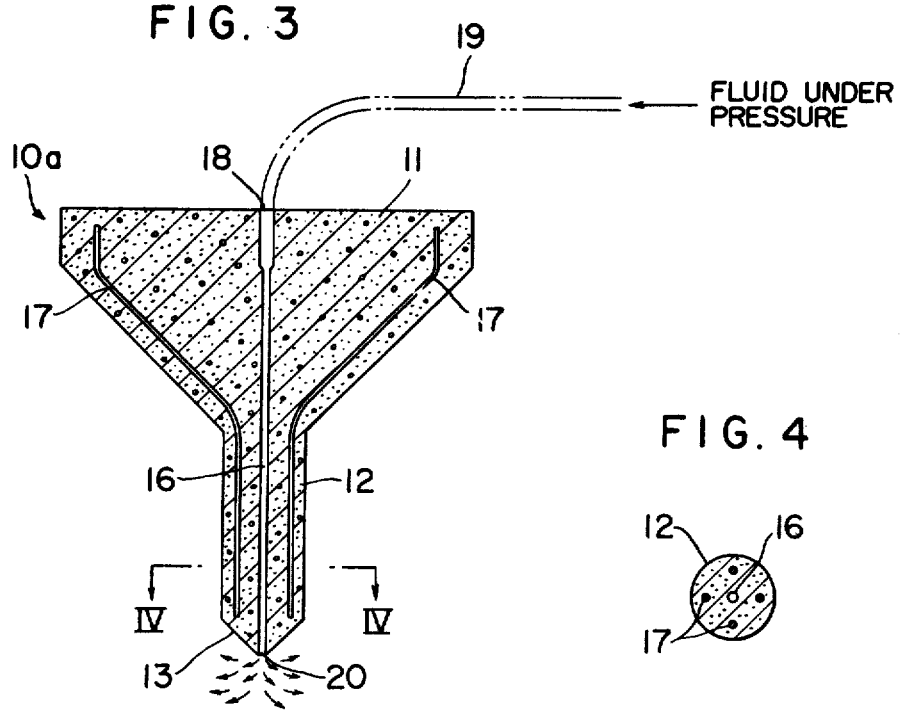
FIG. 3 is an axial sectional view of a modified form of the funnel-shaped structural block in accordance with this invention.
Figure 4:
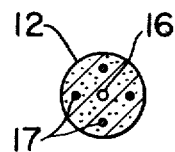
FIG. 4 is a cross sectional view of the modified block, taken along the line IV—IV of FIG. 3.

FIGS. 3 and 4 illustrate a modified structural block or pile 10a, which differs from the block 10 of FIGS. 1 and 2 principally in that a fluid passageway 16 of comparatively small diameter extends axially therethrough. Reinforcing steel bars 17 are built into this modified block 10a as an incidental feature. The other details of construction follow suit after those set forth in connection with the block 10 of FIGS. 1 and 2.

Figure 5:
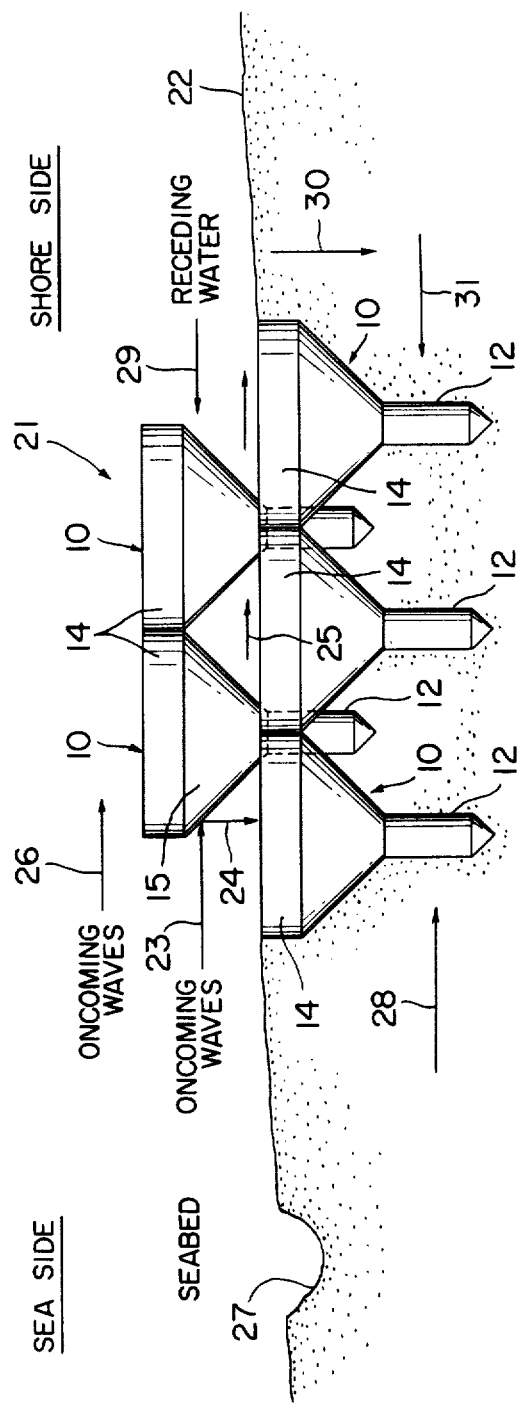
FIG. 5 is an end elevational view of an offshore breakwater built of a multiplicity of funnel-shaped structural blocks shown in FIGS. 1 and 2, the breakwater being shown installed in position offshore and being intended principally to prevent shore erosion.
Figure 6:
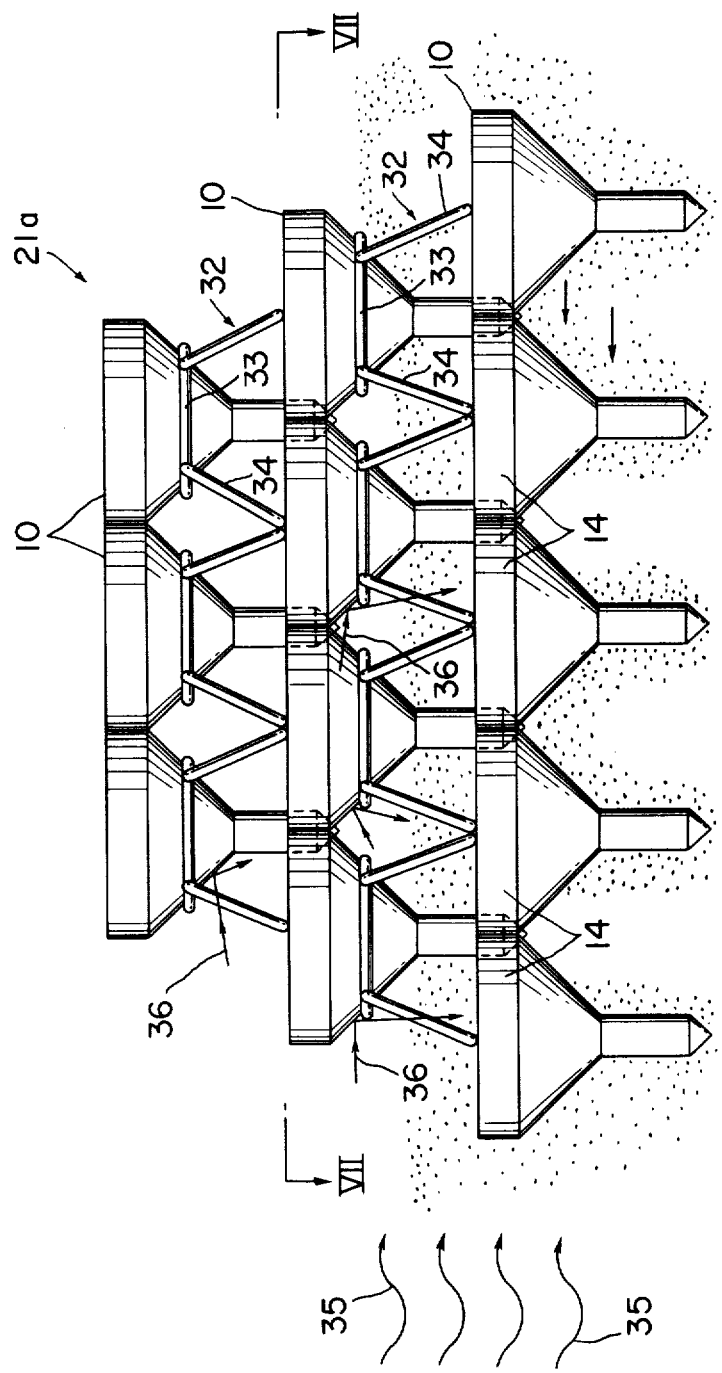
FIG. 6 is an end elevational view of another example of offshore breakwater built of such funnel-shaped blocks, this breakwater being intended principally to build a beach.

The modified block 10a will prove to be of particular utility when employed, for example, as a structural unit of an offshore breakwater (FIGS. 5 and 6). In burying a multiplicity of such blocks 10a to a required depth into the seabed, a pressurized fluid (e.g., air or water) may be delivered into the top end 18 of the fluid passageway 16 of each block as via a flexible conduit 19 from a suitable source of such pressurized fluid (not shown). Emerging from the bottom end 20 of the passageway 16, at the conical tip 13 of the leg 12, the fluid jet drills a hole in the seabed with the descent of the block 10a, by scattering away the sand or other seabed material. The blocks 10a can thus be readily buried to a constant depth into the seabed, without the need for previously excavating same.

In its various civil engineering applications the funnel-shaped structural block of this invention usually functions to the best advantage when kept in vertical disposition in its working position. The block 10a has the advantage that it can be easily buried vertically down, not only into sand but also into other comparable materials, especially if the block is comparatively small in size.

FIG. 5 shows a multiplicity of funnel-shaped elementary blocks 10 of FIGS. 1 and 2 assembled and installed in position for use as an offshore breakwater 21 to prevent beach or shore erosion. The breakwater 21 is installed at a suitable distance offshore and preferably has a constant width of five to ten meters. Purely by way of example, this particular breakwater 21 is shown to be of two layers, including a lower layer formed by three longitudinal rows of elementary blocks 10 and an upper layer formed by two longitudinal rows of elementary blocks.

For construction of this offshore breakwater 21, the elementary blocks 10 to form its lower layer are first buried, with their legs 12 foremost, to an approximately constant depth into the seabed 22. The lower layer blocks 10 of this particular breakwater 21 are shown buried flush with the seabed 22. The cylindrical base or top end portions 14 of the blocks 10 may be in abutting contact with each other. The modified blocks 10a of FIGS. 3 and 4, having the axial fluid passageways 16, could, of course, be employed in lieu of the blocks 10.

The upper layer of the breakwater 21 can be completed simply as at least the legs 12 of additional elementary blocks 10 are planted in the seabed 22, each through the space bounded by every four adjacent blocks of the lower layer. The upper layer blocks 10 are likewise buried to a constant depth and may have their cylindrical top end portions 14 in abutting contact with each other.

The offshore breakwater 21 of the foregoing configuration according to this invention functions in the following manner to damp shoreward wave action, to trap littoral drift, and hence to prevent the erosion of the shore. The approaching waves 23 have their energy reflected and dissipated mostly by the conical surfaces 15 of the upper layer blocks 10 of the breakwater, as indicated by the arrow 24. The damped waves travel shoreward partly through the spaces among the blocks 10 substantially as a streamline flow 25, depositing sand or other littoral drift in so doing, and partly over the complete breakwater 21 as indicated by the arrow 26. Creating a trench 27 in the seabed 22 as they break, the oncoming waves also partly permeate the seabed and travel shoreward under the breakwater 21, as noted by the arrow 28. The receding water 29 also partly permeates the seabed 22, depositing littoral drift thereon, and flows seaward in the directions of the arrows 30 and 31. Thus the offshore breakwater 21 according to this invention effectively intercepts littoral transport thereby positively and economically blocking the progress of erosion.

Because of the unique shape of the blocks and the unique manner in which they are assembled, there is practically no possibility of the underlying seabed portion sinking under the weight of the breakwater 21, of the breakwater damming the flow of underground water, or of severe waves undermining the breakwater.

Figure 7:
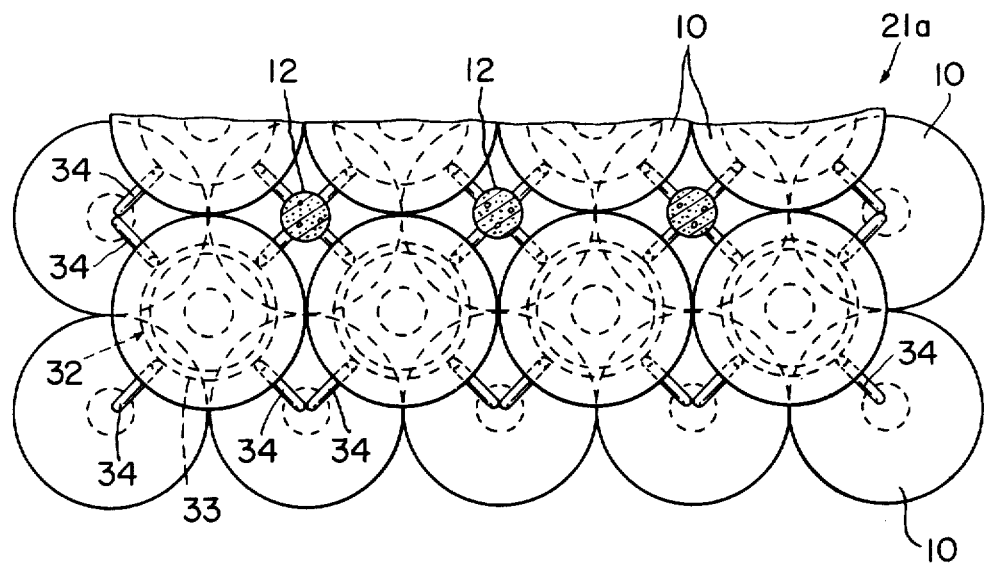
FIG. 7 is a horizontal sectional view of the offshore breakwater of FIG. 6, taken along the line VII—VII of that figure.

FIGS. 6 and 7 illustrate another example of offshore breakwater 21a, also built of the funnel-shaped elementary blocks 10 of this invention, that is intended primarily to widen the beach area. The modified breakwater 21a is shown to be of three layers. The lowermost layer comprises five longitudinal rows of elementary blocks 10 buried directly into the seabed to a constant depth and arranged substantially in longitudinal and transverse alignment, with their cylindrical top end portions in abutting contact with each other. The blocks 10a of FIGS. 3 and 4 can, of course, be substituted for these lowermost layer blocks 10.

Comprising four and three longitudinal rows of blocks 10, respectively, the intermediate and the uppermost layers of the breakwater 21a are built up with the aid of support structures 32 each vertically propping up one of the blocks on the underlying layer of blocks. Each support structure 32 comprises a ring 33 having an inside diameter suitably less than the maximum diameter of each block 10, and a plurality (in this instance, four) of props or shores 34 secured each at one end to the ring 33 at constant angular spacings and angled downwardly and outwardly therefrom.

The ring 33 of each support structure 32 is fitted over the conical body of one of the intermediate and the uppermost layer blocks 10 of the breakwater 21a. Each of the four props 34 of each support structure 32 bears endwise against one of every four adjacent blocks of the underlying layer blocks 10, approximately in the central position of the block.

Figure 8:
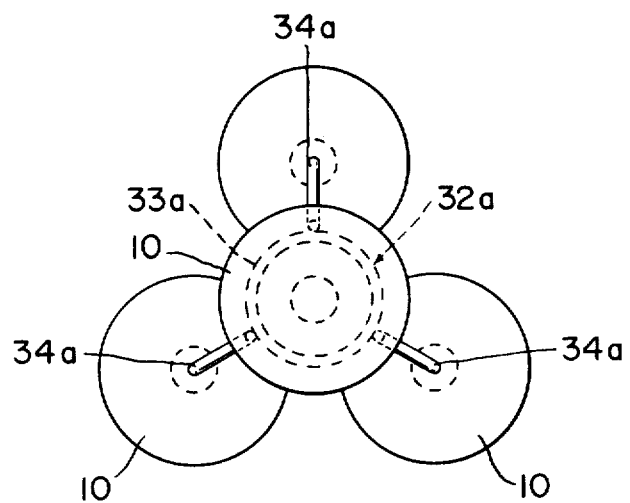
FIG. 8 is a top plan view showing in particular a modification of the support structures used in the offshore breakwater of FIGS. 6 and 7, the view being also explanatory of the manner of use of the modified support structure.

As dictated by circumstances, however, there may be employed an alternative support structure 32a depicted in FIG. 8. This modified support structure 32a has three props 34a, instead of four, each of which is secured at its one end to the ring 33a at constant angular spacings. FIG. 8 also indicates that the support structure 32a stands each block 10 on three adjacent ones of the underlying layer blocks.

Like the offshore breakwater 21 of FIG. 5, the breakwater 21a of FIGS. 6 and 7 functions to reflect and dissipate the energy of the oncoming waves 35 mostly by the conical bodies of its constituent blocks 10, as indicated by the arrows 36. The wave damping action of this breakwater is so complete that the smooth deposition of sand results. The accretion area thus formed tends to widen the beach inshore of the breakwater 21a. As has been described in connection with the breakwater 21 of FIG. 5, the lowermost layer blocks 10 of this breakwater 21a are very stable when the deposited sand covers the intermediate and the uppermost layer blocks. It is therefore self-evident that the breakwater 21a possesses the same advantages as does the breakwater 21.

Although I have herein shown and described my funnelshaped structural block or pile and its possible applications in specific terms, I recognize that the inventive block is open to various other applications. I am also aware that the specific embodiments herein disclosed permit numerous modifications or changes. For example, in some instances, an offshore breakwater may be built by a single layer of my blocks or piles, instead of by two or more superposed layers. Thus this invention is not to be limited to the exact details of this disclosure but is to be accorded the full scope of the appended claims so as to embrace any and all equivalent forms.

I claim:

1. A shore-protective structure comprising a horizontal layer of a plurality of elementary structural blocks placed in mutually adjoining disposition on the surface of a seabed, each structural block having a body substantially in the shape of a right circular cone and a leg extending coaxially from the vertex of the body, said body having an inverted conical surface facing downward and being in contact with the seabed lying therebelow, so that the load of each block is transmitted to the material through the conical surface and evenly distributed in the directions normal to the surface so as to be borne by the seabed, the structural blocks having at least their legs buried downward into the seabed.

2. A shore-protective structure comprising at least first and second superposed horizontal layers of a plurality of elementary structural blocks, said first layer being a lower layer and placed in mutually adjoining disposition on the surface of a seabed, each structural block having a body substantially in the shape of a right circular cone having an inverted conical surface facing downward and a leg extending downwardly and coaxially from the vertex of the body, the conical surface of each of the blocks of the first layer being in contact with the seabed lying therebelow, so that the load of each block of the first layer is transmitted to the seabed through the conical surface and evenly distributed in the directions normal to the surface so as to be borne by the seabed, the leg of each of the blocks of the first layer being buried downward into the seabed to an approximately constant depth, the second layer of the structural blocks having at least their legs buried downward into the seabed through the space bounded by the first layer of structural blocks.

3. A shore-protective structure comprising at least first and second superposed horizontal layers of a plurality of elementary structural blocks, said first layer being a lower layer and placed in mutually adjoining disposition on the surface of a seabed, each structural block having a body substantially in the shape of a right circular cone having an inverted conical surface facing downward and a leg extending downward and coaxially from the vertex of the body, the conical surface of each of the blocks of the first layer being in contact with the seabed lying therebelow, so that the load of each block of the first layer is transmitted to the seabed through the conical surface and evenly distributed in the directions normal to the surface so as to be borne by the seabed, the leg of each of the blocks of the first layer being buried downward into the seabed to an approximately constant depth, and a support structure for supporting each structural block of the second layer over the first layer of structural blocks.

4. The shore-protective structure as recited in claim 3, in which the support structure further comprises a ring having an inside diameter less than the maximum diameter of the conical body of each structural block, and a plurality of props each secured at an end thereof to the ring at constant angular spacings.

5. The shore-protective structure as recited in claim 4, in which the props of the support structure supporting each structural block of the second layer bear endwise against one of the adjoining structural blocks of the first layer substantially in the central position of the block.

6. A shore-protective structure comprising a horizontal layer of a plurality of elementary structural blocks placed on the surface of a foundation material, each structural block having a body substantially in the shape of a right circular cone and a leg extending coaxially from the vertex of the body, said body having an inverted conical surface facing downward and being in contact with the foundation material lying therebelow, so that the load of each block is transmitted to the material through the conical surface and evenly distributed in the directions normal to the surface so as to be borne by the material, said leg being buried downward into the foundation material to concentrate the load of the block and acting as a vertical guide in burying the block.

7. The shore-protective structure as recited in claim 6, wherein the elements of the conical surface of the body are at an angle of about 45 degrees with respect to the centerline axis of the body.

8. The shore-protective structure as recited in claim 6, wherein said body is formed to include a cylindrical base end portion.

9. The shore-protective structure as recited in claim 6, wherein said leg is cylindrical in shape.

10. The shore-protective structure as recited in claim 9, wherein said leg has a conical tip at its end away from the body.

11. The shore-protective structure as recited in claim 6, wherein said block is provided with a fluid passageway extending axially therethrough.

12. A shore-protective structure comprising at least first and second superposed horizontal layers of a plurality of elementary structural block, said first layer being a lower layer and placed in mutually adjoining disposition on the surface of a seabed, each structural block having a body substantially in the shape of a right circular cone and a leg extending downwardly and coaxially from the vertex of the body; a ring having an inside diameter less than the maximum diameter of the conical body of said structural block; and a plurality of props each secured at one end thereof to the ring at constant angular spacings.

13. A shore-protective structure comprising a horizontal layer of a plurality of elementary structural blocks placed in mutually adjoining disposition on the surface of a seabed, each structural block having a body substantially in the shape of a right circular cone and a leg extending coaxially from the vertex of the body; a ring having an inside diameter less than the maximum diameter of the conical body of said structural block; and a plurality of props secured at one end thereof to said ring at constant angular spacing, said props of the support structure supporting each structural block of the second layer are being disposed to bear endwise against one of the adjoining structural blocks of the first layer substantially in the central position of said block.

* * * * *